US006434439B1

(12) United States Patent
Raffoni

(10) Patent No.: US 6,434,439 B1
(45) Date of Patent: Aug. 13, 2002

(54) METHOD FOR CONTROLLING THE ASSEMBLY CYCLE OF A FRAME ASSEMBLING MACHINE AND MACHINE FOR CARRYING OUT THE METHOD

(76) Inventor: Giuseppe Raffoni, Viale D. Bolognesi 24, 47100 Forli' (IT)

( * ) Notice: Subject to any disclaimer, the term of this patent is extended or adjusted under 35 U.S.C. 154(b) by 0 days.

(21) Appl. No.: 09/702,692

(22) Filed: Nov. 1, 2000

(30) Foreign Application Priority Data

Nov. 8, 1999 (IT) ........................................ BO99A0601

(51) Int. Cl.[7] ................................................ G06F 19/00

(52) U.S. Cl. ............................ 700/95; 700/96; 700/97; 700/114; 700/117; 700/58; 700/59; 382/141; 382/151; 382/152; 382/8; 192/69.9; 192/85 A

(58) Field of Search ......................... 700/56–59, 95–98, 700/114, 117; 144/346, 192, 52–58; 703/1, 69.9; 192/85 A; 345/419, 426, 428, 424; 382/141, 120–125, 151–152, 148

(56) References Cited

U.S. PATENT DOCUMENTS 4,681,498 A * 7/1987 Raffoni ....................... 411/461
4,830,257 A * 5/1989 Lin ............................ 227/152
4,876,787 A * 10/1989 Ditty et al. .................... 29/430
4,995,087 A 2/1991 Rathi ........................ 192/69.9
5,091,962 A * 2/1992 Malloy et al. ................. 382/8
5,191,706 A * 3/1993 Cosden ........................ 29/787
5,319,918 A 6/1994 Baur ............................. 59/61
5,333,979 A * 8/1994 Raffoni ....................... 411/477
5,336,038 A * 8/1994 Raffoni ....................... 411/478
5,758,812 A * 6/1998 Raffoni ....................... 227/120
5,816,467 A * 10/1998 Dunn ............................ 227/3
6,010,053 A * 1/2000 Werfeli ........................ 227/99
6,164,512 A * 12/2000 Raffoni ....................... 227/152

FOREIGN PATENT DOCUMENTS

WO 99 26766 6/1999

* cited by examiner

*Primary Examiner*—Ramesh Patel
(74) *Attorney, Agent, or Firm*—Guido Modiano; Albert Josif; Daniel O'Byrne

(57) ABSTRACT

A cross-section of one of the strips in a frame is digitized in binary format by means of a scanner and graphically visualized; dimensions of the cross-section and points suitable for positioning a strip locking device are determined, together with points of application of the stapling elements and the number of the elements to be applied in each point. A frame assembling machine is then activate to perform the actual stapling of the strips.

5 Claims, 4 Drawing Sheets

METHOD FOR CONTROLLING THE ASSEMBLY CYCLE OF A FRAME ASSEMBLING MACHINE AND MACHINE FOR CARRYING OUT THE METHOD

BACKGROUND OF THE INVENTION

The present invention relates to a method for controlling the assembly cycle of a frame assembling machine and to a machine for carrying out the method.

Frame assembling machines are known in which the manufacturing cycle is controlled by a system in which the necessary information is entered by an operator by means of an appropriately provided keyboard. This information varies according to the profile of the strips that compose the frame.

The information that the operator must enter in the system relate to the height and number of staples to be used for the corner jointing of the strips, to the positions in which the staples are to be inserted, particularly the distance from the outside and inside comers of the frame, and to the position of the means by way of which the frames are fixed to the worktable.

SUMMARY OF THE INVENTION

The aim of the present invention is to provide a method which allows to automatically control an assembling machine on the basis of parameters derived from the cross-section of the strips.

Within the scope of this aim, an object of the present invention is to provide an apparatus whose characteristics are defined in the appended claims.

This aim and this object are achieved with a method for controlling the assembly cycle of strips for forming frames in assembling machines, characterized in that it comprises the steps of:

- reading, by means of a scanner, the cross-section of one of the strips that compose the frame in order to obtain a resulting image of said cross-section;
- digitizing the resulting image in binary format;
- graphically visualizing said cross-section;
- calculating dimensions of the cross-section;
- identifying points suitable for positioning strip locking means;
- determining points of application of stapling elements and the number of said elements to be applied in each point;
- activating the assembling machine to perform the stapling of the strips.

BRIEF DESCRIPTION OF THE DRAWINGS

Further characteristics and advantages of the method according to the present invention will become better apparent hereinafter on the basis of the accompanying drawings, wherein.

DESCRIPTION OF THE PREFERRED EMBODIMENTS

Figure 1:
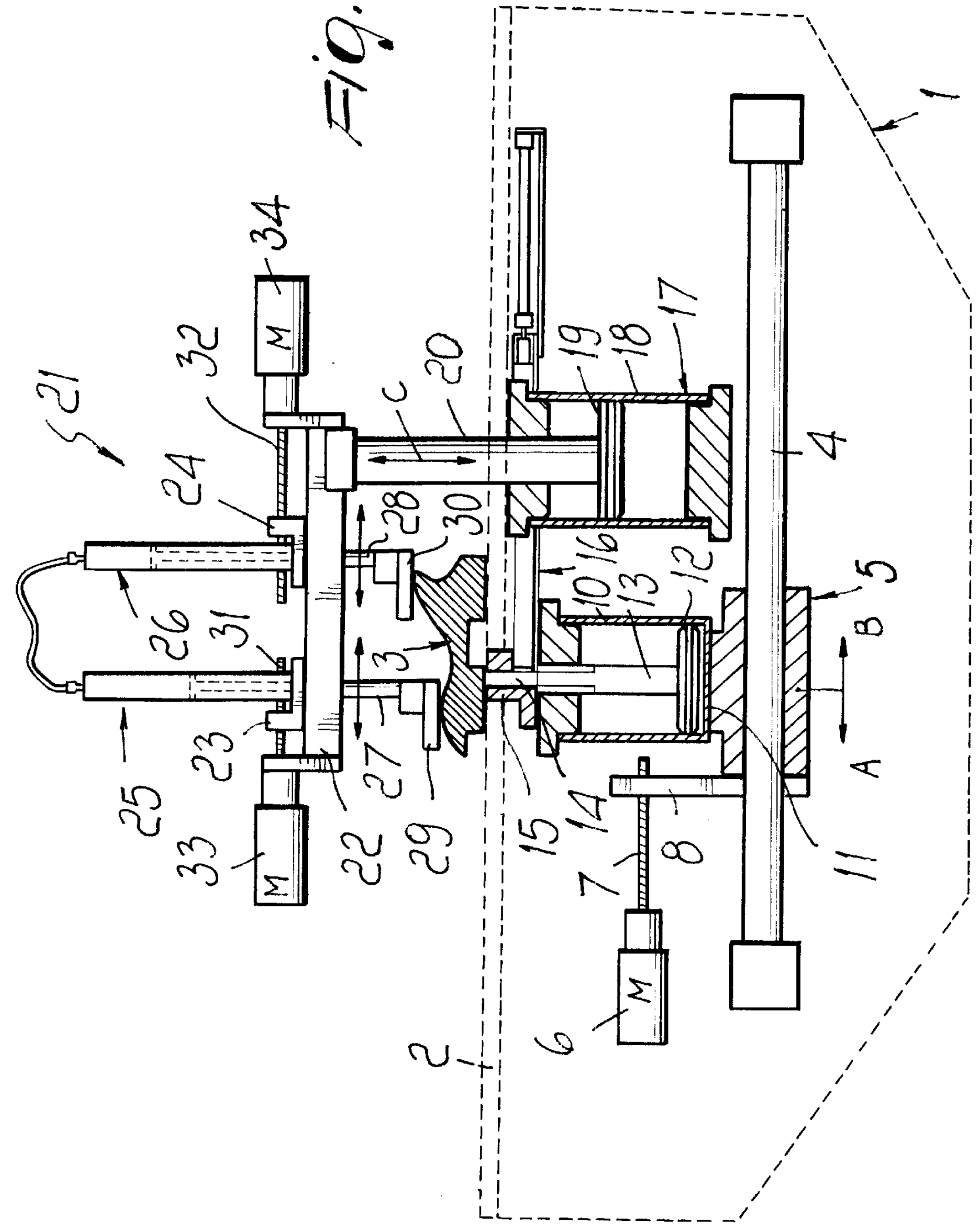
FIG. 1 is a schematic and non-limitative exemplifying view of a frame assembling machine which allows to carry out the method according to the present invention.

With reference to FIG. 1, the apparatus for performing the method comprises a footing 1 provided with a worktable 2 on which means are provided for arranging strips 3 for forming a frame. In the footing 1, under the worktable 2, there are fixed guides 4 for the sliding of a carriage 5 which can be positioned along the guides 4 by means of a reversible motor 6 which is fixed to the footing 1 and whose output shaft 7 is threaded so as to engage by screwing in a shoulder 8 of the carriage 5. The shaft 7, turned by the motor 6, allows to move the carriage 5 in both directions A and B.

A conventional stapling head, generally designated by the reference numeral 9, is rigidly arranged on the carriage 5. The head 9 comprises a cylinder 10 which has a vertical axis and inside which a piston 12 is movable, said piston having a stem 13 which protrudes upward and ends with a striker punch 14 for expelling the stapling elements, particularly for the corner jointing of two strips that compose the frame.

The striker punch 14 is guided in a channel of a head 15 which protrudes from the worktable 2 through a slot which is parallel to the shaft 7.

The elements for joining the strips, typically laminar staples, are contained in a magazine 16 and are conveyed into the channel of the head 15 through a lateral opening of the head.

A fluid-actuated actuator 17 is further installed below the worktable 2 and is composed of a cylinder 18 which is fixed below the worktable 2 and in which a piston 19 runs in the direction C. A column-shaped stem 20 is rigidly coupled to the piston 19, protrudes above the worktable 2 and supports a strip locking device, generally designated by the reference numeral 21, which is composed of an arm 22 which cantilevers out from the top of the column 20 to which it is fixed and includes guiding means for a pair of sliders 23 and 24.

Two hydraulic jacks 25 and 26 are fitted on the sliders 23 and 24 and their stems 27 and 28 protrude downward below the arm 22 and support respective pads 29 and 30 at their lower end.

Respective threaded shafts 31 and 32 are engaged by screwing in the sliders 23 and 24 and can be actuated by a pair of motors 33 and 34 so as to allow the movement of the sliders 23 and 24 along the guides independently of each other.

According to the method of the invention, once the profile of the cross-section of the strips 3 has been detected, the motors 33 and 34 are actuated so as to place the pads 29 and 30 in the intended positions for locking the strips 3. At the same time, the motor 6 is actuated so as to arrange the stapling head 9 on the points where the staples for joining the strips 3 are to be inserted.

Figure 2:
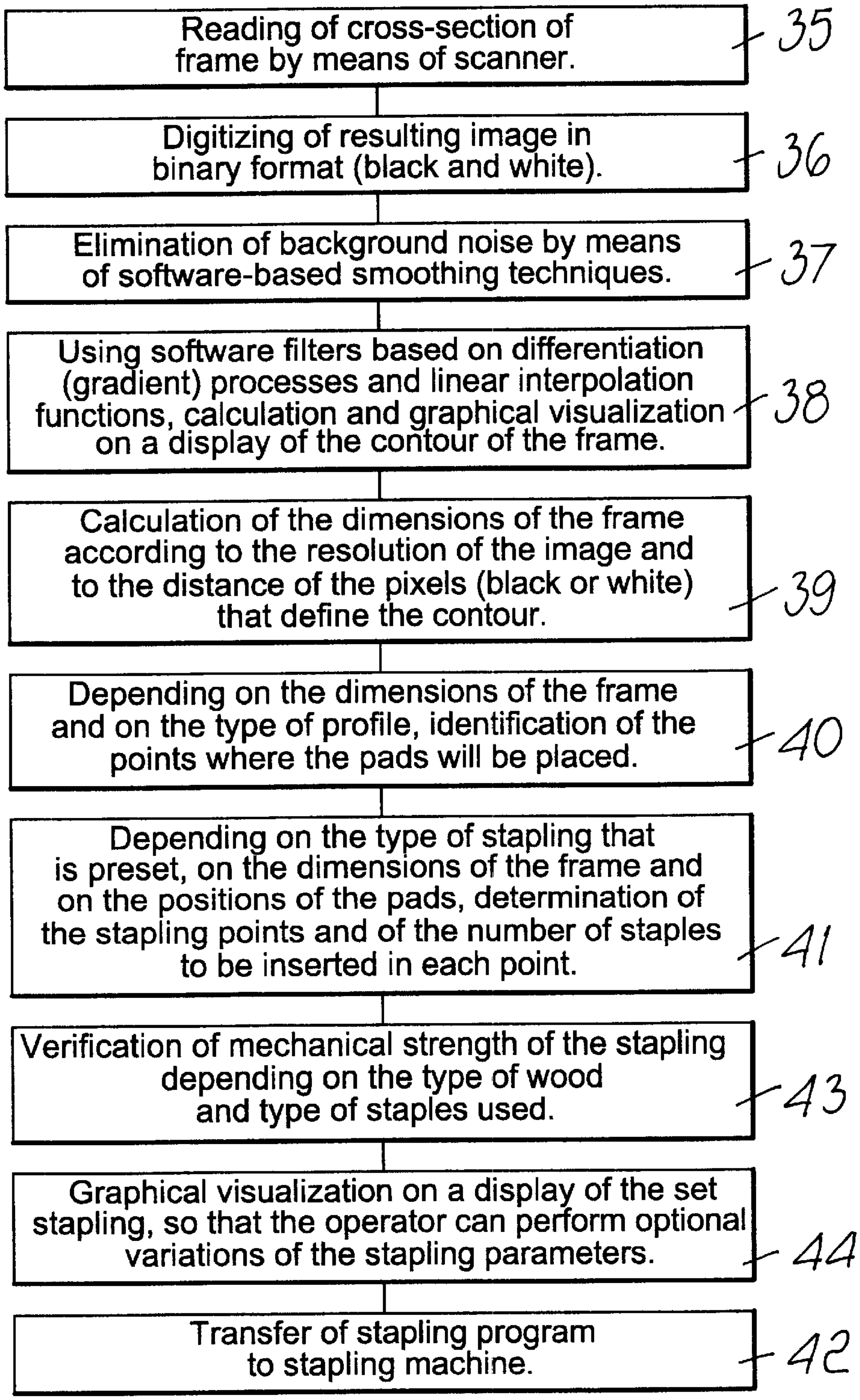
FIG. 2 is a flowchart of the operating sequence of the method.

According to the flowchart of FIG. 2, the method starts by reading, step 35, the cross-section of the strips that compose the frame. This can occur by means of a scanner which faces a reference "slice" of the strip used.

The image obtained by the scanner is processed so as to provide the stapling machine with the necessary operating instructions.

This processing comprises the digitizing 36 of the image in binary format (black and white).

By using smoothing methods, the elimination 37 of the background noise from the image and the calculation and graphical visualization 38 on an appropriate display of the contour of the cross-section are performed. Such calculation and visualization can use electronic filters based on differentiation processes (gradient) and linear interpolation functions.

Depending on the resolution of the image and on the distance of the black and white pixels that define the contour, the calculation 39 of the dimensions of the frame is performed and the type of strip is identified. From the detected dimensions and the type (profile) of the identified strip, identification 40 of the points where the locking pads 29 and 30 are to be placed is performed.

The position 41 in which the staples must be driven into the strips and their number is determined depending on the type of stapling provided, i.e., on the characteristics of the staples used, on the sectional dimensions of the strips and on the frame to be provided, and on the engagement positions of the locking pads.

The stapling program thus set is sent to the stapling machine 42, which performs it by initially placing the pads 29 and 30 and actuating them into the position for locking the strips and by then moving the carriage 5 along the guides 4 so that the stapling head 9 is arranged in a staple insertion point. Then, by means of the motor 6, the head 9 is moved at the other positions for inserting the staples.

Conveniently, after determination 41 of the position of the staples and before transfer of the stapling program to the stapling machine 42, it is possible to perform a verification 43 of the mechanical strength of the stapling according to the type of wood and staples used and a graphical visualization 44 on a display of the set stapling, so that the operator can perform optional variations of the stapling parameters.

Figure 3:
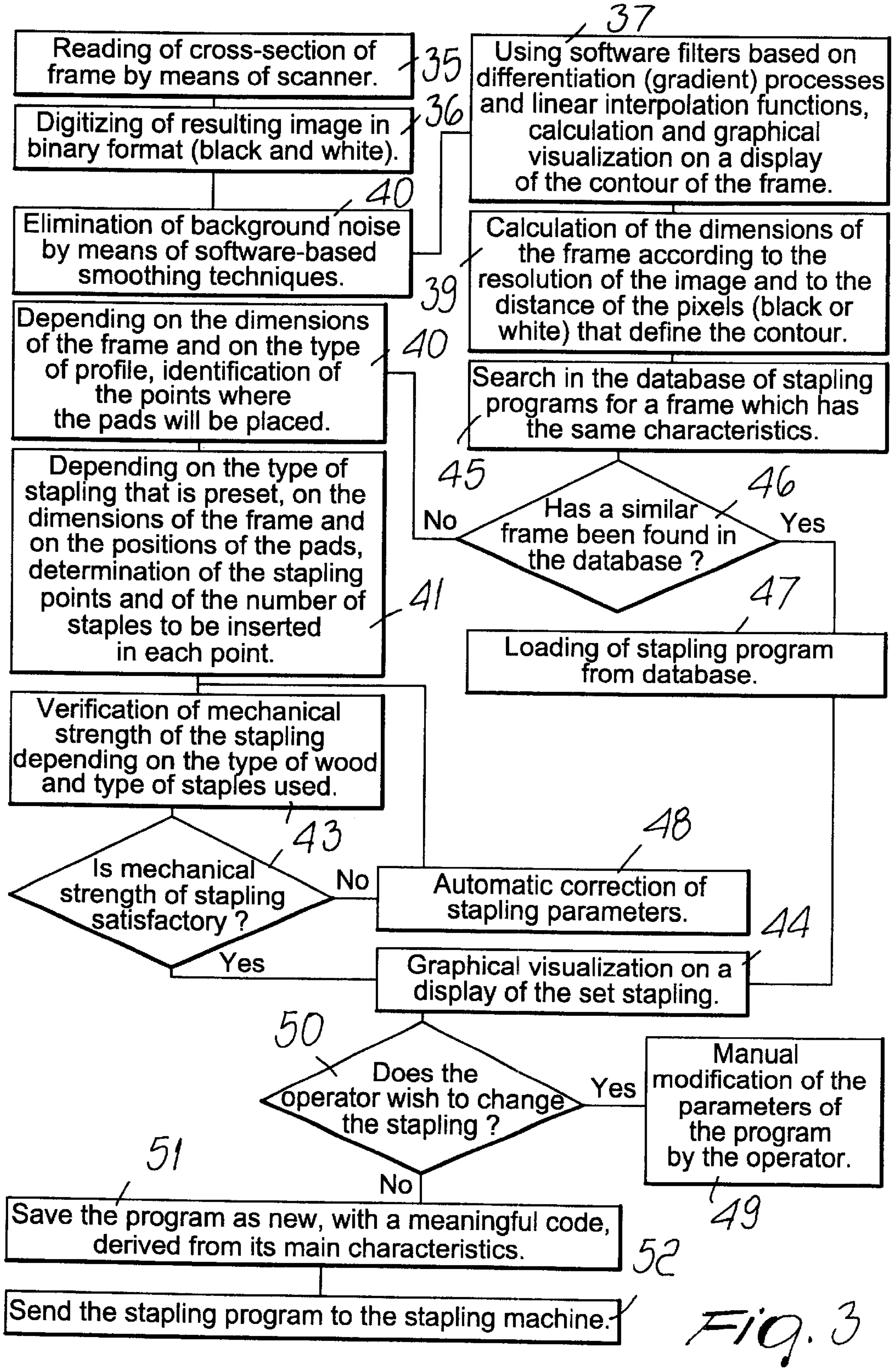
FIGS. 3 and 4 are two flowcharts of two further embodiments of the method.

The described method is susceptible of numerous modifications and variations, all of which are within the scope of the same inventive concept. FIG. 3 illustrates an embodiment in which, after calculation 39 of the dimensions of the frame and identification of the type of strip used, a search is conducted on a database 45 which contains programs for stapling a strip having the same characteristics as the visualized one. If the search leads to a positive decision 46, the program is loaded 47 and visualized 44.

On the other hand, if the decision 46 is negative, after identification 40 of the locking points, determination 41 of the stapling points and of the number of staples, verification 43 of mechanical strength is performed, with consequent automatic correction 48 of the stapling parameters or with visualization 44 of the stapling.

At this point it is possible to perform, or not perform, manual modifications 49 of the parameters of the stapling program.

In case of a negative decision regarding modifications, the program 51 is saved as new and transferred 52 to the stapling machine.

Figure 4:
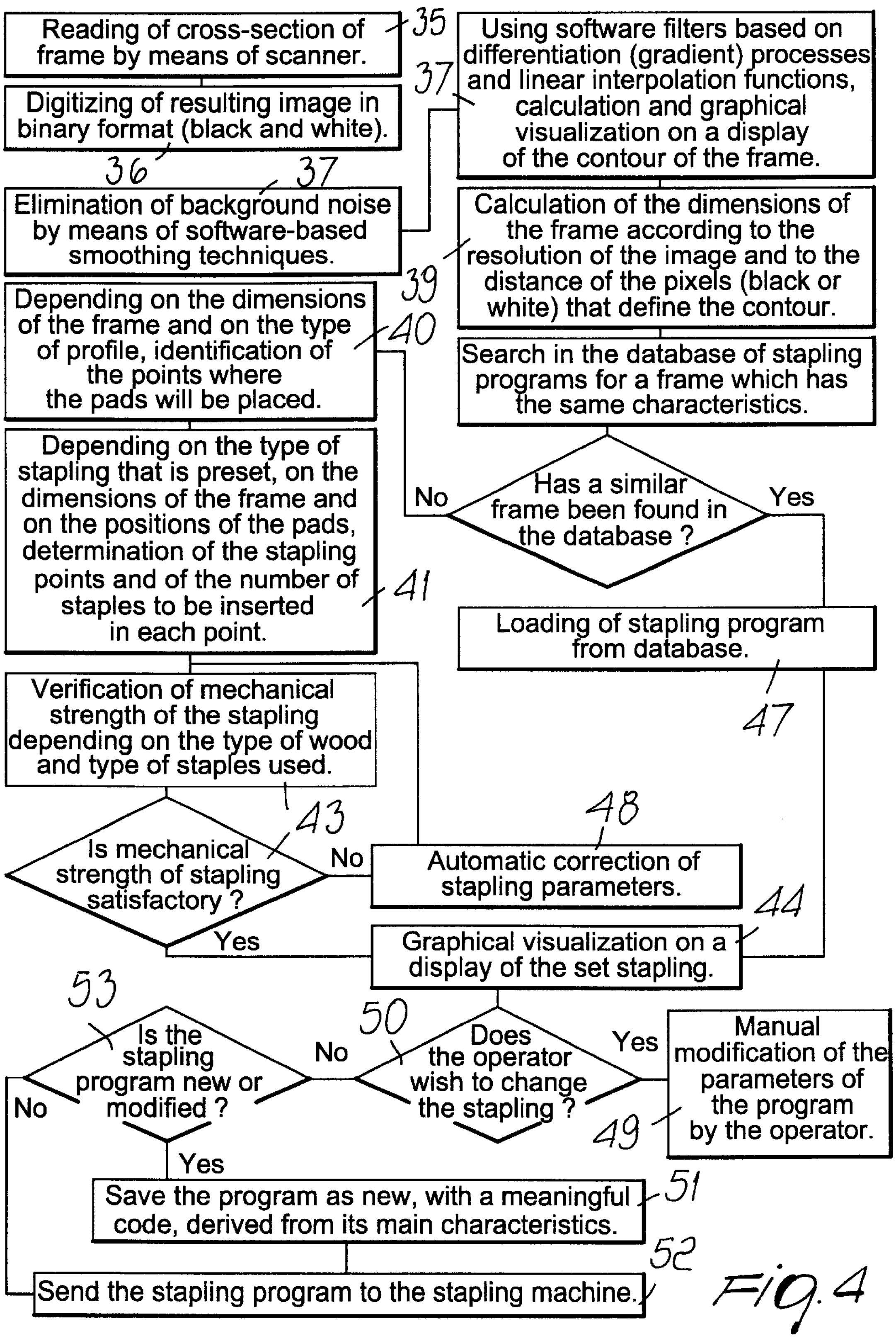

FIG. 4 illustrates another embodiment in which, if an operator does not wish to make changes 50 to the stapling program before it is saved and sent to the stapling machine, the newness or existence of applied modifications 53 is checked.

The disclosures in Italian Patent Application No. BO99A000601 from which this application claims priority are incorporated herein by reference.

What is claimed is:

1. A method for controlling an assembly cycle of strips for forming a frame in an assembling machine, comprising the steps of:

a) reading, by means of a scanner, a cross-section of one of the strips that compose the frame in order to obtain a resulting image of said cross-section;

b) digitizing the resulting image in binary format;

c) graphically visualizing said cross-section;

d) calculating dimensions of the cross-section;

e) identifying points suitable for positioning strip locking means;

f) determining points of application of stapling elements and the number of said elements to be applied in each point;

g) activating the assembling machine to perform the stapling of the strips.

2. The method according to claim 1, wherein after digitizing the resulting image in binary format, background noise of the image is eliminated by means of electronic smoothing techniques.

3. The method according to claim 1, wherein filters based on differentiation processes and linear interpolation functions are used for calculation and graphic visualization of the cross-section and of dimensions thereof.

4. The method according to claim 1, wherein after determining the points of application of the stapling elements and the number of said elements, verification of the mechanical strength of the stapling is conducted according to the type of wood of the strips and to the type of stapling elements used.

5. The method according to claim 1, wherein after calculating the dimensions of the cross-section, a search is conducted on a database which contains programs for stapling a strip having the same characteristics as the one being visualized.

* * * * *